United States Patent
Zalik et al.

(10) Patent No.: US 11,741,537 B1
(45) Date of Patent: *Aug. 29, 2023

(54) SYSTEMS AND METHODS FOR PROVIDING CLOSED-END LOANS

(71) Applicant: Greensky, LLC, Atlanta, GA (US)

(72) Inventors: David Zalik, Atlanta, GA (US); Jeffrey Gold, Atlanta, GA (US); Robert Lanier, Atlanta, GA (US); Jacob F. Crowe, Lilburn, GA (US); Robert W. Lee, Ft. Mitchell, KY (US)

(73) Assignee: Greensky, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,475

(22) Filed: Nov. 20, 2020

Related U.S. Application Data

(63) Continuation of application No. 16/940,297, filed on Jul. 27, 2020, now Pat. No. 10,846,793, which is a continuation of application No. 14/745,861, filed on Jun. 22, 2015, now Pat. No. 10,726,477.

(60) Provisional application No. 62/023,688, filed on Jul. 11, 2014.

(51) Int. Cl.
  *G06Q 40/00* (2023.01)
  *G06Q 40/03* (2023.01)
(52) U.S. Cl.
  CPC .................................. *G06Q 40/03* (2023.01)
(58) Field of Classification Search
  USPC ........................................................... 705/38
  See application file for complete search history.

(56) References Cited

U.S. PATENT DOCUMENTS

| | | | | |
|---|---|---|---|---|
| 7,239,860 B2* | 7/2007 | Stoks | ...................... | G08B 25/08 |
| | | | | 455/458 |
| 7,606,764 B1* | 10/2009 | Mancini | ................. | G06Q 20/10 |
| | | | | 705/17 |
| 7,676,409 B1* | 3/2010 | Ahmad | ................ | G06Q 20/204 |
| | | | | 705/35 |
| 7,676,425 B1* | 3/2010 | Noles | ..................... | G06Q 20/10 |
| | | | | 705/38 |

(Continued)

OTHER PUBLICATIONS

Social Media Analytics for Better Detection of Fraudulent Applications for Online Microfinance Loans IEEE (Year: 2019).*

(Continued)

*Primary Examiner* — Bruce I Ebersman
(74) *Attorney, Agent, or Firm* — Troutman Pepper Hamilton Sanders LLP; Christopher C. Close, Jr.

(57) ABSTRACT

In an example implementation, a method includes receiving, at a computing device, borrower information, requested financing plan information, and credit bureau information relating to a particular borrower. Likewise, a method includes processing at least one of the received information to identify a subset of lenders as potential candidates to approve a loan for the particular borrower and generate an offer of the loan for the borrower. Further, the method includes performing a portfolio assignment process and generating electronic documents relating to the loan following the borrower's acceptance of the offer. Finally, the method includes sending an offer of the loan to a borrower and, upon receipt of the borrower's acceptance, transmitting the loan documents to the borrower.

11 Claims, 6 Drawing Sheets

(56) References Cited

U.S. PATENT DOCUMENTS

| | | | |
|---|---|---|---|
| 7,895,116 B2* | 2/2011 | Chatter | G06Q 40/025 705/37 |
| 8,306,986 B2 | 11/2012 | Routson et al. | |
| 8,473,410 B1 | 6/2013 | Haggerty et al. | |
| 8,538,869 B1* | 9/2013 | Haggerty | G06Q 40/06 705/38 |
| 8,682,763 B1 | 3/2014 | Erlanger | |
| 8,793,184 B2* | 7/2014 | Lakshminarayanan | G06Q 20/02 235/379 |
| 8,868,028 B1* | 10/2014 | Kaltsukis | H04W 76/50 455/404.1 |
| 9,530,143 B2* | 12/2016 | Bender | G06Q 30/0255 |
| 10,395,256 B2* | 8/2019 | Harris | G06Q 30/02 |
| 11,164,406 B2* | 11/2021 | Meroux | G08G 1/0112 |
| 2003/0033241 A1* | 2/2003 | Harari | G06Q 40/08 705/38 |
| 2003/0135451 A1* | 7/2003 | O'Brien | G06Q 40/06 705/38 |
| 2003/0138084 A1* | 7/2003 | Lynam | H04M 15/70 379/196 |
| 2003/0200182 A1* | 10/2003 | Truitt | G06Q 20/16 705/75 |
| 2006/0123053 A1* | 6/2006 | Scannell | G06F 16/9577 |
| 2006/0223518 A1* | 10/2006 | Haney | H04M 3/4228 455/420 |
| 2007/0073612 A1* | 3/2007 | Smith | G06Q 40/02 705/38 |
| 2007/0073613 A1* | 3/2007 | Lee | G06Q 40/025 705/38 |
| 2008/0109334 A1* | 5/2008 | Lewis | G06Q 40/02 705/35 |
| 2008/0177561 A1* | 7/2008 | Bonnell | G06Q 10/083 705/317 |
| 2008/0207327 A1* | 8/2008 | Van Luchene | G06N 3/006 463/42 |
| 2009/0076972 A1* | 3/2009 | Witchel | G06Q 40/06 705/37 |
| 2010/0228651 A1* | 9/2010 | Becerra | G06Q 40/025 705/30 |
| 2011/0098016 A1* | 4/2011 | Hatton | H04M 11/04 704/9 |
| 2011/0178934 A1* | 7/2011 | Imrey | G06Q 40/02 706/47 |
| 2012/0011043 A1* | 1/2012 | Sorbe | G06Q 40/025 705/37 |
| 2012/0150567 A1* | 6/2012 | Bissoon | G06Q 40/08 705/40 |
| 2012/0258693 A1* | 10/2012 | Oren | H04M 15/49 455/414.1 |
| 2012/0284172 A1* | 11/2012 | Bryman | G06Q 40/02 705/38 |
| 2012/0310831 A1* | 12/2012 | Harris | G06Q 30/02 705/44 |
| 2013/0290504 A1* | 10/2013 | Quady | H04L 12/2823 709/223 |
| 2013/0311299 A1* | 11/2013 | Quady | G06Q 50/16 705/14.66 |
| 2013/0339217 A1* | 12/2013 | Breslow | G06Q 40/025 705/38 |
| 2014/0006129 A1 | 1/2014 | Heath | |
| 2015/0127493 A1* | 5/2015 | Winkelman | G06Q 20/3224 705/26.81 |
| 2015/0149245 A1* | 5/2015 | Duan | G06Q 10/04 705/7.31 |
| 2015/0156030 A1* | 6/2015 | Fadell | G06Q 10/083 700/90 |
| 2015/0379488 A1* | 12/2015 | Ruff | G06Q 40/06 705/40 |
| 2016/0189119 A1* | 6/2016 | Bowman | G06Q 20/3821 705/39 |
| 2017/0046669 A1* | 2/2017 | Chow | G06Q 10/0631 |
| 2018/0202822 A1* | 7/2018 | DeLizio | B60R 25/24 |
| 2018/0374283 A1* | 12/2018 | Pickover | G07C 5/085 |
| 2020/0073864 A1* | 3/2020 | Jo | G06F 21/64 |
| 2020/0074853 A1* | 3/2020 | Miller | H04W 4/02 |
| 2020/0200090 A1* | 6/2020 | Costello | B64D 31/06 |
| 2020/0226559 A1* | 7/2020 | Boss | H04L 9/3239 |
| 2020/0242858 A1* | 7/2020 | Meroux | G07C 5/085 |
| 2020/0311665 A1* | 10/2020 | Gray | G06Q 10/0835 |
| 2020/0402149 A1* | 12/2020 | Dutta | G06Q 30/0282 |
| 2020/0402391 A1* | 12/2020 | Dutta | G08G 1/017 |
| 2021/0105276 A1* | 4/2021 | Collinson | H04L 63/0435 |
| 2021/0133670 A1* | 5/2021 | Cella | G06N 3/044 |
| 2021/0239478 A1* | 8/2021 | Mathai | G06Q 10/20 |

OTHER PUBLICATIONS

Software as a Service: Leveraging Social Relationships in Financial Transactions IP.COM (Year: 2008).*

Microfinance risk analysis using the business intelligence IEEE (Year: 2016).*

Comparative Analysis of New Loan Patterns Based on E-Finance for Small and Medium-Sized Enterprises IEEE (Year: 2011).*

Marketplace lending A maturing Market Means New Partner Models, Business Opportunities (Year: 2014).

Real Time Credit Card Fraud Defection using Computational Intelligence (Year: 2008).

The Impact of ICT on Intermediation in the Microfinance Industry ieee (Year: 2013).

* cited by examiner

SYSTEMS AND METHODS FOR PROVIDING CLOSED-END LOANS

CROSS REFERENCE TO RELATED APPLICATION

This application claims the benefit, under 35 U.S.C. § 120 to U.S. patent application Ser. No. 16/940,297 entitled "SYSTEMS AND METHODS FOR PROVIDING CLOSED-END LOANS," filed 27 Jul. 2020, which is a continuation of U.S. patent application Ser. No. 14/745,861 entitled "SYSTEMS AND METHODS FOR PROVIDING CLOSED-END LOANS," filed 22 Jun. 2015, which claims benefit under 35 U.S.C. § 119(e), of U.S. Provisional Patent Application No. 62/023,688, filed 11 Jul. 2014, entitled "SYSTEMS AND METHODS FOR PROVIDING CLOSED-END LOANS," the entire contents and substance of which is incorporated herein by reference in its entirety as if fully set forth below.

TECHNICAL FIELD

Aspects of the present disclosure relate to systems and methods for originating and assigning loans.

BACKGROUND

While potential borrowers may wish to undertake large-scale home improvement projects or other projects that require significant funds, it may be difficult to obtain funding for such projects when the borrower wishes to finance the project. For example, if a borrower wants to replace the roof on her house or purchase furniture for her house, the overall cost may be more than what is available in a typical credit line while being much smaller than a typical loan or home equity line of credit. Further, it may be more convenient for a merchant (e.g., a roofing company or furniture dealer) to accept and process credit card payments in which case a mortgage loan may not be appropriate for the borrower's needs. Further still, while a borrower may have access to funds to finance such a project (e.g., the borrower has available cash or credit on hand), it may be attractive to obtain a loan with favorable terms instead of using the borrower's own funds. Finally, obtaining a mortgage loan can be a time-consuming and stressful endeavor. Accordingly, what is needed is a system and methods for originating installment loans from among multiple funding sources in real time so a borrower has immediate access to the funds associated with the loan, and a merchant can accept payment from the loan funds in the same manner that the merchant processes a typical credit card payment.

SUMMARY

Some or all of the above needs may be addressed by certain implementations of the disclosed technology. According to an example implementation, a method is provided. The method comprises receiving, at a computing device, borrower information, wherein the borrower information relates to a particular borrower, requested financing plan information, and credit bureau information relating to the particular borrower. Further, the method comprises processing, at the computing device, at least one of borrower information, requested financing plan information, and credit bureau information relating to the particular borrower, to identify, from a plurality of lenders, a subset of lenders as potential candidates to approve a loan for the particular borrower, wherein each of the plurality of lenders has individual bank credit policies, and wherein the subset of lenders is identified based on their bank credit policies aligning with the at least one of borrower information, requested financing plan information, and credit bureau information relating to the particular borrower. Likewise, the method comprises performing, at the computing device, a portfolio assignment process, wherein the computing device assigns the loan to a particular lender in the subset of lenders. Further, the method comprises, responsive to determining the particular lender, transmitting, via the computing device, a credit offer for presentation to the borrower and generating, via the computing device, electronic loan documents associated with the loan, wherein the electronic loan documents comprise a transaction processing access device comprising at least one of a credit card number, a card verification value, and an expiration date. Finally, the method comprises transmitting, via the computing device, an offer of the loan to the particular borrower; and responsive to receiving an acceptance of the loan, transmitting, via the computing device, the electronic loan documents to the borrower.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
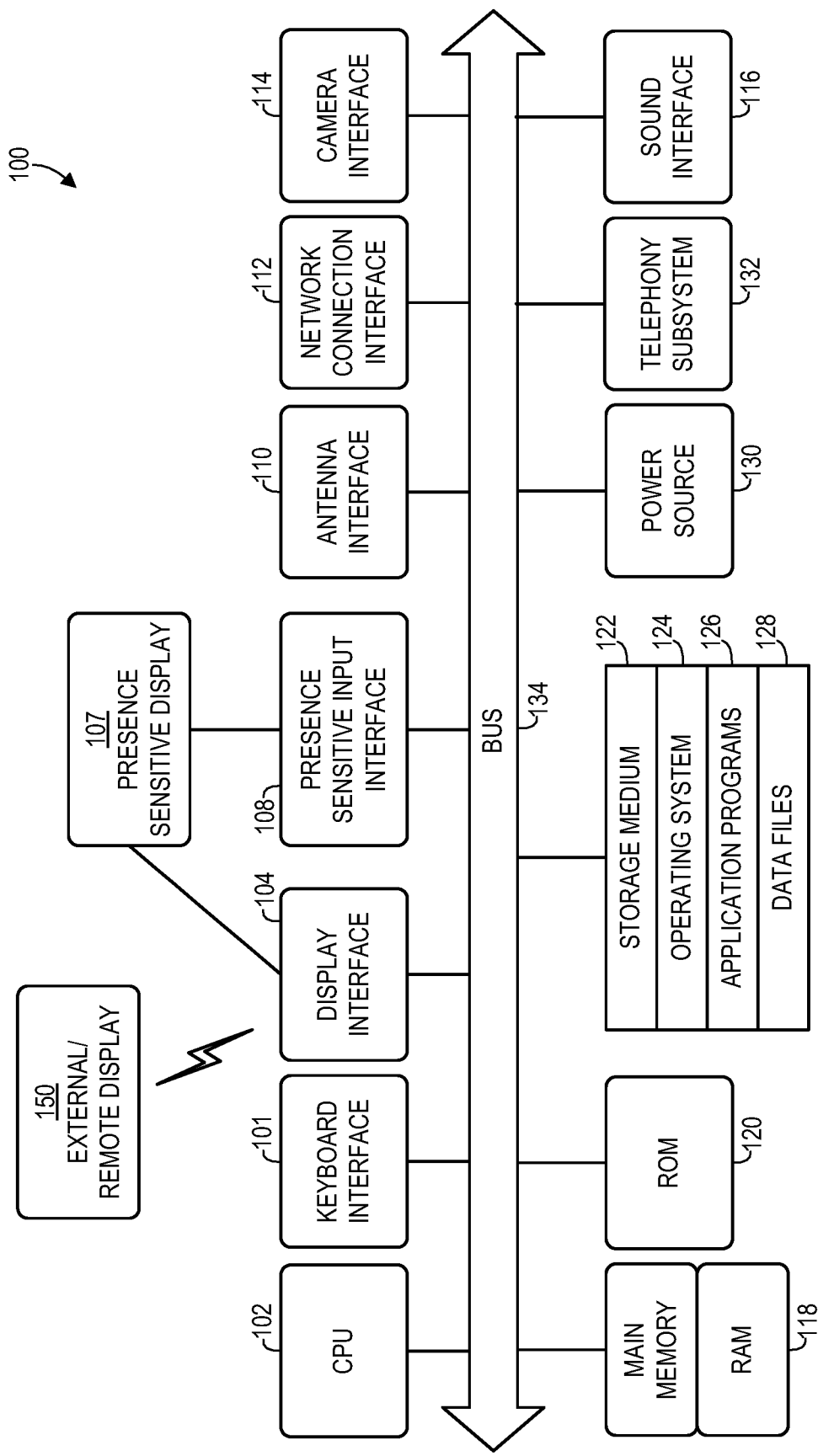
FIG. 1 is a block diagram of an illustrative computer system architecture 100, according to an example implementation.

In some implementations of the disclosed technology, a consumer finance system ("CFS") may receive information relating to one or more merchants (i.e., merchant information), which may be service providers, retailers, etc., who want the ability to offer financing plans to their customers (i.e., potential borrowers). Upon receiving merchant information, a CFS may initiate a merchant credentialing process to determine what types of financing plans a merchant is qualified to offer. In some embodiments, a CFS may request credentialing information relating to the merchant from one or more third-party sources. For example, a CFS may request information relating to the merchant's creditworthiness or fraud potential. After receiving credentialing information relating to the merchant, the CFS may then assign one or more rate plans to the merchant, which the merchant can then offer to their customers (i.e., potential borrowers). As will be understood, the rate plans may have varying terms (e.g., 12 months with no financing charge, 36 months with an interest rate of 5.9%, etc.), and merchants having more favorable credentialing information, as determined by the CFS, may be assigned preferred rate plans, which may be more desirable to their potential customers.

Further, in some implementations of the disclosed technology, a CFS may receive information relating to a potential borrower (i.e., borrower information) and a requested financing plan, which may be received directly from a potential borrower or a merchant associated with the CFS with the potential borrower's consent. In such implementations, upon receipt of the borrower information, which may include the requested financing plan, the CFS may initiate an underwriting process. In one implementation, based on the borrower information, the CFS may request credit bureau information relating to the potential borrower. Based on the credit bureau information, the borrower information, and the requested financing plan, the CFS may determine, from a plurality of banking partners or lenders, a subset of lenders that may be willing to approve the requested financing plan based on the bank credit policies of the lenders. Upon determining the subset of lenders, the CFS may perform a portfolio assignment process in which the requested financing plan is assigned to a particular lender in the subset of lenders who have committed a consortium of funds to be assigned by the CFS. After assigning the loan, the CFS may transmit a credit offer (i.e., a confirmed offer of a financing plan) to the borrower. Further, in one implementation, after receiving acceptance of the credit offer, the CFS may generate electronic loan documents, which the CFS transmits to the buyer. In an example implementation, the electronic loan documents may comprise a transaction processing access device, which may allow the borrower to access funds from the loans and utilize the funds with a merchant capable of processing credit card payments.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, Bluetooth-connected device, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored.

According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or wearable computer. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
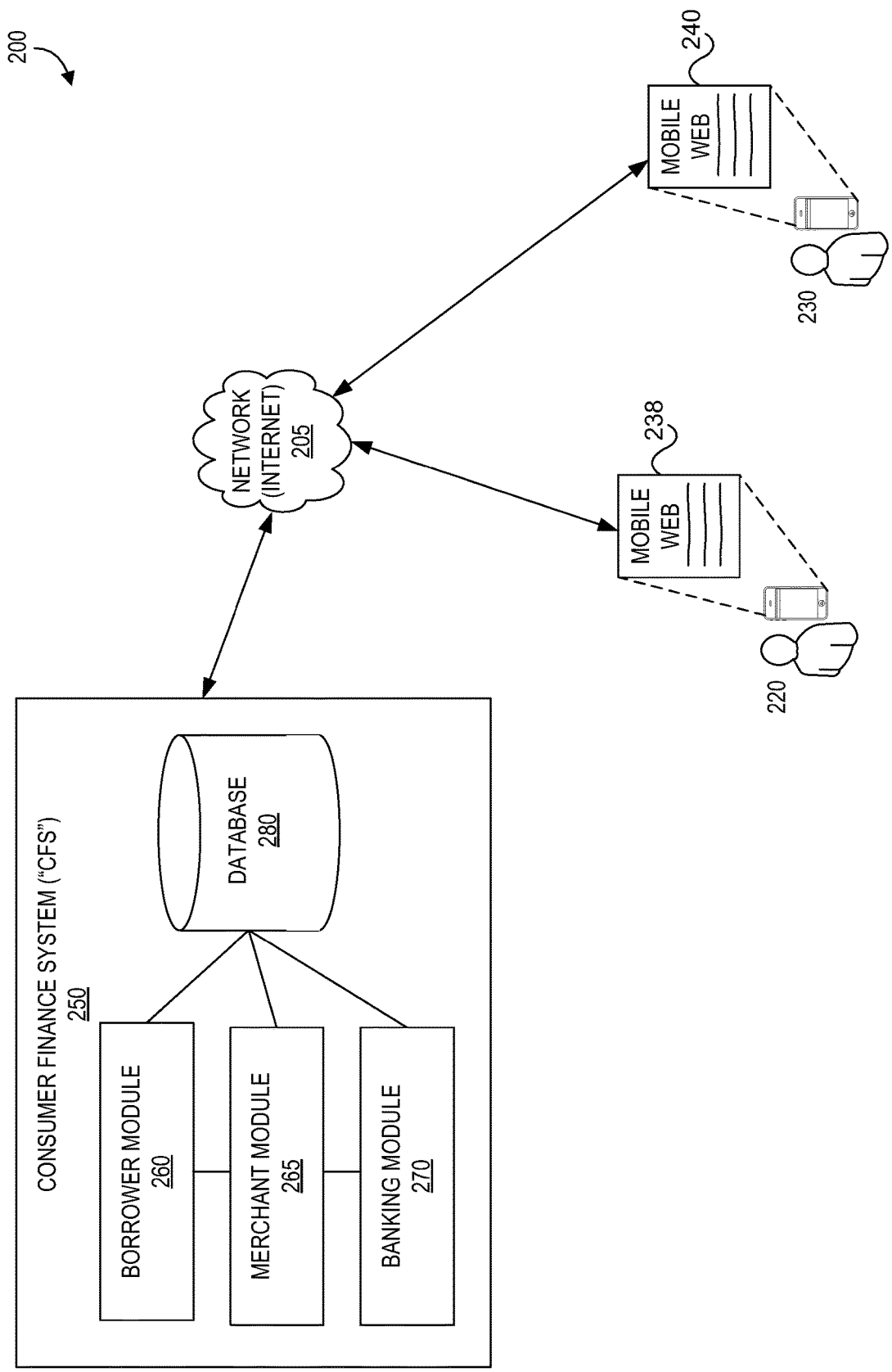
FIG. 2 is an overview of an environment 200 in which a consumer finance system 250 is utilized, according to an example embodiment.

FIG. 2 is an overview 200 of an embodiment of a consumer finance system ("CFS") 250 in an exemplary environment, constructed and operated in accordance with various aspects of the present disclosure. As shown in FIG. 2, a CFS 250 may comprise a borrower module 260 for carrying out various computer-implemented processes of the CFS 250. The CFS 250 may likewise include a banking module 270 and a merchant module 265 for carrying out various other computer-implemented processes of the CFS 250. Embodiments of a CFS 250 further include various databases for storing system data, such as database 280. Architectural details showing various software modules, engines, and databases comprising an embodiment of a CFS 250 will be described in greater detail below.

According to various embodiments, an implementation of a CFS 250 may include some or all of the components of the computing device 100 shown in FIG. 1. Additionally, according to the embodiment shown in FIG. 2, a CFS 250 may comprise a borrower module 260, a banking module 270, and a merchant module 265 that are operatively connected as a unitary system. Alternatively, the borrower module 260, banking module 270, and merchant module 265 may be physically separated and be connected through a network (e.g., network 205, which may be the Internet). Generally, such operative connections involve a secure connection or communications protocol, and communications over a network typically involve the use of one or more services such as a Web-deployed service with client/server architecture, a corporate Local Area Network ("LAN") or Wide Area Network ("WAN"), or through a cloud-based system.

According to some embodiments of the present disclosure, a CFS 250 is hosted on a third-party physical server located on a cloud server. Further, according to some embodiments, the borrower module 260, merchant module 265, and banking module 270 are servers or collections of software relating to a plurality of software modules, processes, subroutines, or various algorithms operated by an embodiment of a CFS 250. Further, as noted, according to some embodiments, the borrower module 260, merchant module 265, and banking module 270, and the various sub-modules and processes that make up the modules, are connected to a database 280 for storing various types of data utilized by the CFS 250.

Generally, a CFS 250 includes operative (and preferably wireless) connections to potential customers or users, which may be one or more merchants 220 or one or more borrowers 230, typically through a mobile device or general purpose computer, which may include some or all of the components of the computing device 100 shown in FIG. 1. As shown in FIG. 2, merchants 220 or borrowers 230 may utilize mobile devices (i.e., 238 and 240, respectively), which may provide access to a CFS 250 via an web page, mobile application, etc. In some embodiments, a mobile application executing on a mobile device (i.e., 238 or 240) may be specifically configured to access a CFS 250. Further, in some embodiments, a merchant 220 or buyer 230 may interact with a proprietary mobile application or internal system executing on their mobile device (e.g., 238 or 240, respectively), which may be configured to communicate with a CFS 250 or a mobile application associated with the CFS 250. In addition to a mobile device (e.g., 238 or 240), a borrower 230 or merchant 220 may access a CFS 250 using a desktop computer, laptop computer, tablet device, etc., using a web browser or application configured for the particular device, according to an example embodiment.

Generally, operative connections between a CFS 250 and a user (e.g., borrower 230 or merchant 220) involve a secure connection or communications protocol and communications over a network 205 (e.g., the Internet) may involve use of one or more services as described above and as will be understood by one of ordinary skill in the art. Further, various networking components such as routers, switches, hubs, etc., are typically involved in such communications, and although not explicitly shown in FIG. 2, certain embodiments of the present disclosure may include one or more secure networks, gateways, or firewalls that provide information security from unwarranted intrusions and cyber attacks.

Generally, borrowers 230 include individuals who may be interested in obtaining a financial loan for a variety of purposes. For example, a borrower 230 may be interested in hiring professionals (e.g., merchants 220) to complete one or more home improvement projects at the borrower's 230 home. For example, a borrower 230 may be interested in hiring a merchant 220 to replace the roof, gutters, or windows at the borrower's 230 home. In certain circumstances, the borrower 230 may not have the means to pay for the home improvement project and thus may be interested in financing the project (i.e., borrowing money from a lender to pay for the project and paying the lender back over time by way of incremental payments).

As noted, merchants 220 may include contractors or service providers. For example, a merchant 220 may be a roofing company, painting company, general contractor, or any other service provider. In various circumstances, merchants 220 may be willing to facilitate a process by which potential customers (e.g., borrower 230) may obtain financing for the merchants' 220 services.

The discussions above in association with FIGS. 1 and 2 are merely intended to provide an overview of an embodiment of the present consumer finance system. Accordingly, it will be understood that the descriptions in this disclosure are not intended to limit in any way the scope of the present disclosure. In particular, the architecture as well as the specific modules and databases shown in FIG. 2 are shown for illustrative purposes only, and embodiments of the present system are not limited to a specific architecture, as a CFS 250 may comprise any combination of modules, components, and databases necessary to perform the functions described herein. The functions and operations of these exemplary modules and system components are described in greater detail below with respect to the various sequence diagrams and figures displayed in FIGS. 3-4.

Figure 3:
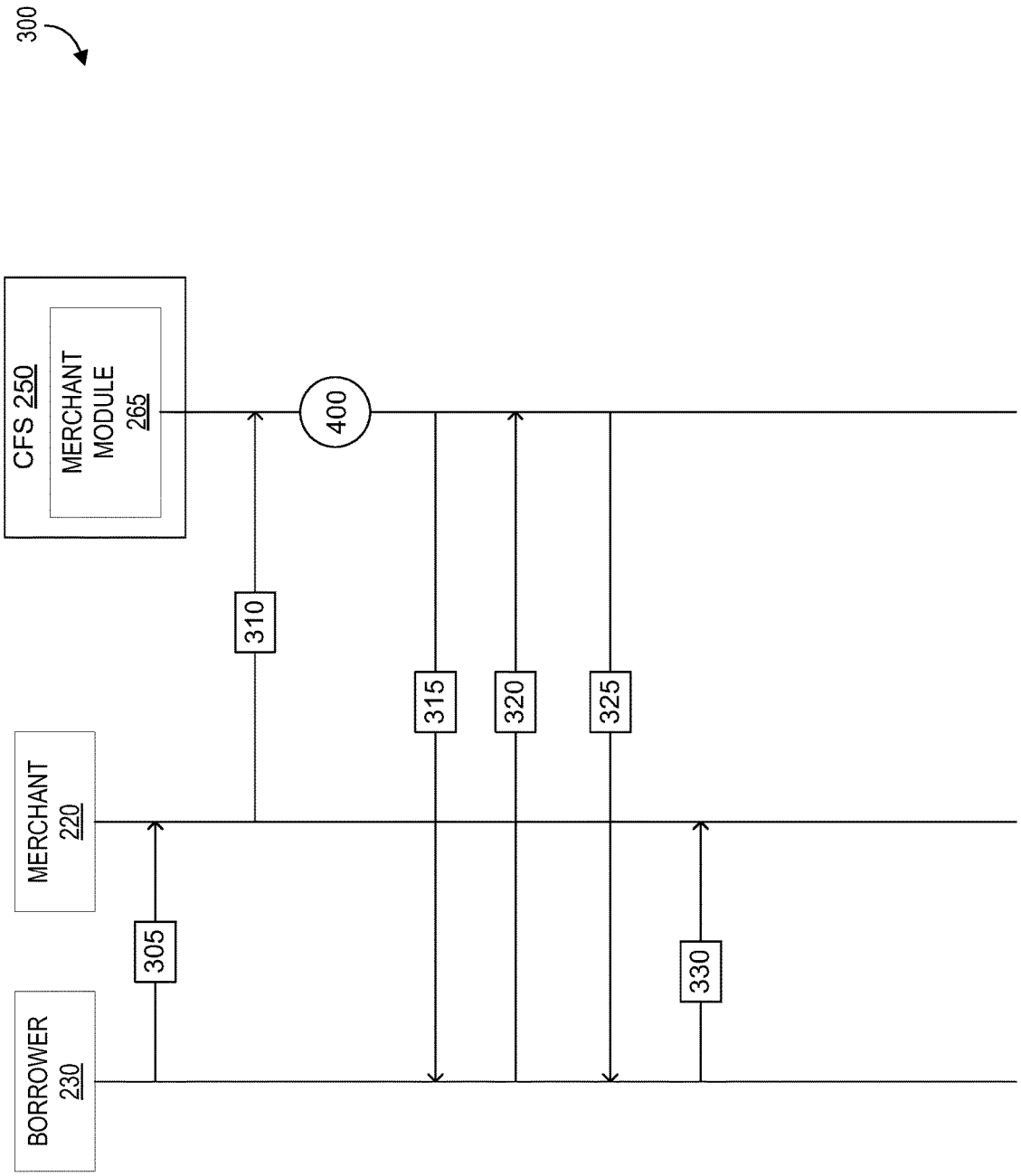
FIG. 3 is a sequence diagram illustrating an exemplary credit application process 300, according to an example implementation.

FIG. 3 is a sequence diagram illustrating an exemplary credit application process 300, which may be completed in real time, according to some embodiments. As discussed above, a borrower 230 may be interested in acquiring various services from a merchant 220. For example, a borrower 230 may be interested in hiring a merchant 220 to replace the roof on the borrower's 230 house or buying furniture. In some embodiments, the merchant 220 may have access to a CFS 250, which may be used to request financing on behalf of and with the consent of borrower 230 so that the borrower 230 can pay the merchant 220 to provide the service (e.g., replacing the roof on the borrower's 230 house or selling furniture to the borrower 230). In an example scenario, at 305, a borrower 230 provides borrower information (i.e., credit application information) to a merchant 220, which may be used to obtain financing. For example, a borrower 230 may provide one or more of name, Social Security number, address, date of birth, and any other information that may be used to identify the borrower 230.

The borrower 230 may provide the borrower information to the merchant 220 in a variety of ways. For example, the borrower 230 may simply fill out a paper form, which the merchant may transmit to the CFS 250 (e.g., via a web browser), according to some embodiments. In another embodiment, the borrower 230 may provide the information to an application such as a mobile application that may be running on a computing device (e.g., 238 or 240). In certain embodiments, a mobile application may be configured to receive the borrower information from a borrower 230 from a valid form of identification such as a driver's license or a passport. For example, in some embodiments, a mobile application may be configured to scan a driver's license or other piece of identification for relevant borrower information, for example by utilizing optical character recognition ("OCR") or by scanning a barcode. In some embodiments, a CFS 250 may receive geolocation information from a mobile device (e.g., 238 or 240), which may allow the CFS 250 to verify certain borrower information. Further, a CFS 250 may receive certain borrower information (e.g., a borrower's address) from geolocation information received from a mobile device (e.g., 238 or 240). Additionally, in some embodiments, geolocation information may assist a CFS 250 in preapproving certain borrowers 230. For example, a merchant may target a particular area (e.g., a neighborhood) for providing services (e.g., roofing services) and offering financing plans to pay for those services. In some embodiments, using geolocation information, a CFS 250 may preapprove potential borrowers 230 in the neighborhood such that the merchant 220 may be more efficient in terms of making offers to pre-qualified borrowers 230.

In some embodiments, a borrower 230 may provide borrower information directly to the CFS 250 without the aid of a merchant 220. For example, a borrower 230 may provide borrower information verbally over the phone to a representative of the CFS 250 or via a website provided by the CFS 250, which may be received by a borrower module 260 according to some embodiments. Additionally, a borrower may provide information via fax, mail, interactive voice response (IVR), or other means, which may be received by a representative associated with the CFS 250 and input into the CFS 250. Thus, as will be appreciated, in some embodiments, a borrower 230 may contact the CFS 250 directly to initiate a credit application process 300. In that way, prior to selecting a merchant 220, a borrower 230 can obtain financing for a project.

In addition, in some embodiments, in addition to providing contact information at 305, a borrower 230 may provide an indication of a financing plan the borrower 230 is interested in obtaining (i.e., requested financing plan information). For example, a merchant 220 may present a plurality of financing plans to a borrower 230 depending on various criteria (e.g., the amount of money the borrower 230 needs to finance, the amount of money the borrower 230 can pay each month, how much time the borrower 230 intends to take to pay back the loan, etc.). In some embodiments, a merchant 220 may present a borrower with financing plans such as "no interest for 12 months," "5.9% interest for 60 months," etc. As will be understood and appreciated, any number of financing plans may be available for presentation to a borrower 230.

As shown in FIG. 3, after the merchant 220 receives the borrower information and financing plan information from the borrower 230, the merchant may transmit the borrower information and financing plan information to a merchant module 265 of a CFS 250, at 310, according to some embodiments. As discussed, a merchant 220 may receive borrower information from a borrower 230 via, for example, a mobile application running on a mobile device (e.g., 238 or 240). The mobile device 238 may then transmit the borrower information and financing plan information to the merchant module 265 of the CFS 250. For example, the mobile device 238 may transmit the borrower information and financing plan information to the merchant module via a network 205 such as the internet. Upon receipt of the borrower's 230 borrower information (and requested financial plan, according to example embodiments), the merchant module 265 may initiate an underwriting process 400, which will be discussed in relation to FIG. 4.

Following the underwriting process 400, in some embodiments, a merchant module 265 may transmit a credit offer (i.e., a confirmed offer of a financing plan) to the borrower 230 for the borrower to accept or reject, at 315. For example, merchant module 265 may transmit the credit offer (i.e., confirmed offer) directly to the borrower 230 (e.g., to a website or a mobile application running on a mobile device (e.g., 240) operated by the borrower 230). In one example embodiment, the merchant module 265 may transmit the confirmed offer to the merchant 220, who may then present the offer to the borrower 230.

If the borrower 230 is interested in accepting the credit offer (i.e., accepting the confirmed offer of a financing plan), the borrower may transmit an acceptance of the confirmed offer of a financing plan to the merchant module 265, at 320, according to some embodiments. In some embodiments, the borrower 230 may reject the offer and pursue an alternative financing plan.

Figure 4:
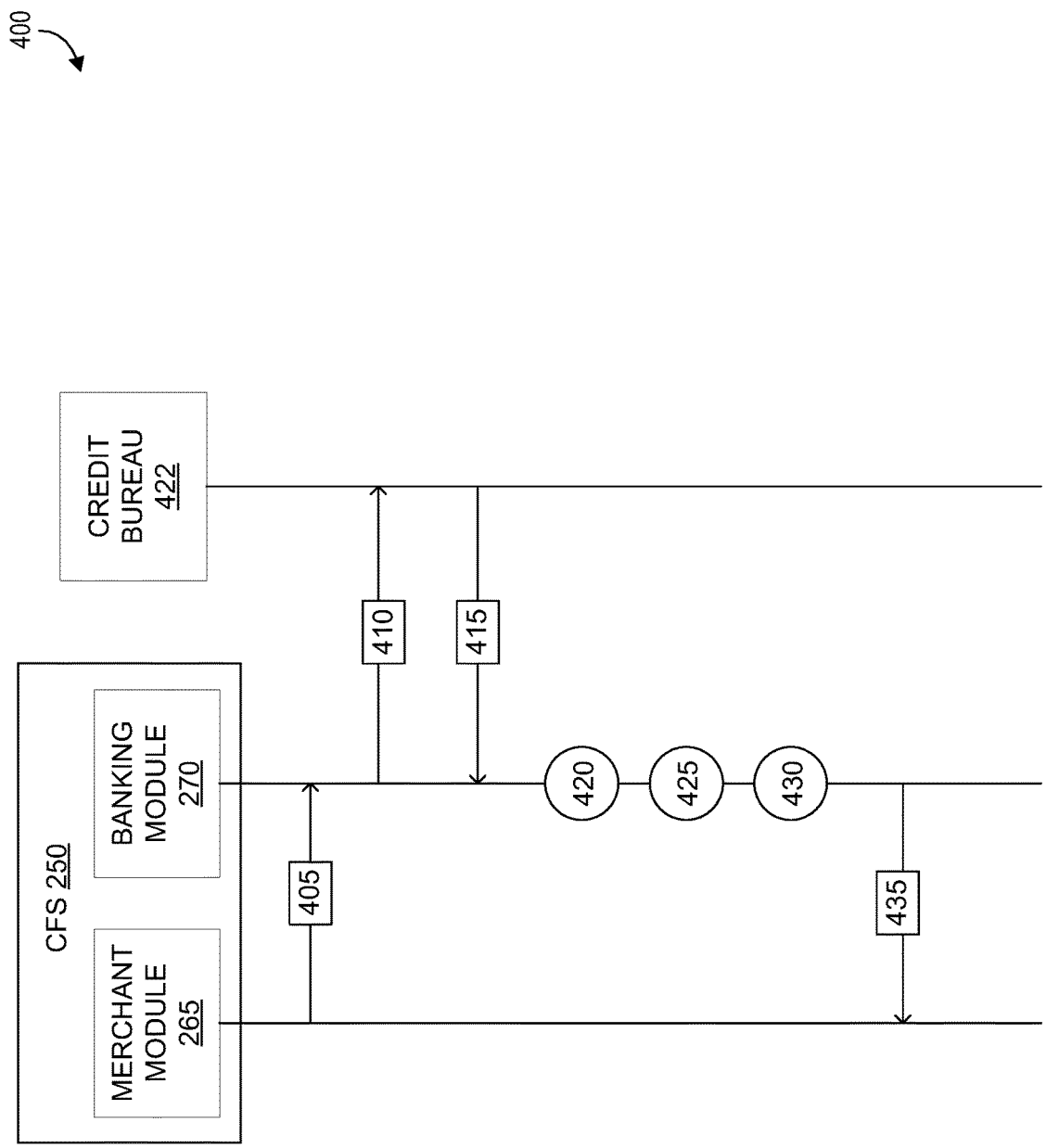
FIG. 4 is a sequence diagram illustrating an example underwriting process 400, according to an example implementation.

At 325, the merchant module 265 may transmit electronic loan documents to the borrower 230, which may be generated as part of the underwriting process 400, as shown in FIG. 4. In some embodiments, the electronic loan documents may be dynamically generated and then issued to the borrower 230 in real time following receipt of the acceptance of the confirmed offer of a financing plan. Further, in some embodiments, the electronic loan documents are issued in the name of a financial institution having a relationship with the CFS 250 (i.e., the financial institution to which the CFS 250 assigns the loan, as will be discussed in relation to FIG. 4).

In example embodiments, the electronic loan documents may include a transaction processing access device ("TPAD"), which may include a 16-digit credit card number for providing the borrower 230 access to the loan funds (i.e., allow the borrower 230 to make purchases using the funds). Further, in example embodiments, the TPAD may include a card verification value ("CVV") number and an expiration date such that, in conjunction with the 16-digit card number (i.e., credit card number), the merchant 220 may be able to process payment from the borrower 230 using a conventional credit card terminal as the merchant 220 would process a typical credit card payment, at 330. Further, in some embodiments, the CFS 250 may be configured to limit a TPAD such that the TPAD is limited to use with a particular merchant or merchants, as specified by the CFS 250. In other example embodiments, the CFS 250 may configure the TPAD such that the TPAD can be used with any merchant capable of processing credit card payments. In some embodiments, the TPAD is configured to allow a CFS 250 to provide installment loans on credit card rails.

In some embodiments, use of the TPAD may constitute acceptance of the terms and conditions of the installment loan by the borrower 230. As will be understood and appreciated, the disclosed credit application process 300 allows for an instant apply-and-buy solution with no delay in funding or next step required.

FIG. 4 is a sequence diagram illustrating an exemplary underwriting process 400, according to some embodiments. As discussed in relation to FIG. 3, after receiving borrower information and requested financing plan information, the CFS 250 may initiate an underwriting process 400. For example, in some embodiments, a merchant module 265 may receive the borrower information and the requested financing plan information and subsequently initiate the underwriting process 400.

In some embodiments, after receiving borrower information and requested financing plan information, a merchant module 265 may transmit the information to a banking module 270, at 405. At 410, the banking module 270 may transmit borrower information to a credit bureau 422 to request credit bureau information relating to the potential borrower. As will be understood, credit bureau information may include a borrower's 230 credit score or the borrower's 230 credit characteristic information, including but not limited to, credit card accounts, other loans (e.g., car loans, home loans), or other financial information (e.g., bank account balances, savings account balances, retirement account balances). In some embodiments, the banking module 270 may employ certain third-party software to assist with various processes of the banking module 270, which may include the acquisition of credit bureau information from a credit bureau 422. At 415, the banking module 270 may receive the credit bureau information relating to the potential borrower.

In certain embodiments, a CFS 250 may have relationships with a plurality of banks or lenders (i.e., multiple funding sources) capable of loaning money to borrowers 230 (i.e., potential candidates to approve the loan). As will be understood and appreciated, in general, the plurality of banks and lenders typically have varying risk tolerances and may have varying criteria upon which they base their lending decisions (i.e., bank credit policies). In some embodiments, a CFS 250 may comprise a banking module 270, which may comprise a rules engine relating to the lending policies (i.e., bank credit policies) of the various lending partners. For example, certain lenders may be willing to lend money to borrowers only in certain states, or borrowers may limit the amount of money they are willing to lend in a particular state. Further, certain lenders may only be willing to offer certain financing plans or may only be willing to make loans up to a certain dollar amount. Additionally, as will be understood and appreciated, lenders may factor credit bureau information into their lending decisions (i.e., credit bureau information may be factored into their bank credit policies). In some embodiments, various lenders may have additional criteria relating to credit bureau information that influences whether they are willing to approve a particular loan (i.e., customer risk profile). For example, certain lenders may not be willing to loan money to a borrower 230 unless the borrower 230 has a minimum credit score.

Accordingly, in some embodiments, depending on the information included in the borrower information, the requested financing plan information, and/or the credit bureau information, the banking module 270 may determine one or more banking partners or lenders (i.e., a subset of lenders) from the multiple funding sources who may be candidates to fund the requested loan based on lending criteria (i.e., bank credit policies) the lenders have provided to the CFS 250, at 420. Put differently, based on the requested financial plan information, the borrower information, and/or the credit bureau information, as well as the bank credit policies of the various lending partners, the banking module 270 may identify a subset of lenders who are candidates for approving the borrower's 230 requested loan because the requested financing plan information, the borrower information, and/or the credit bureau information align with or fall within the lenders' lending criteria (i.e., their bank credit policies, which may include FICO information, debt-to-income ratio, and various other information). Put differently, a particular lender's lending criteria may set guidelines for a borrower's maximum debt-to-income ratio or consumer credit risk score (e.g., FICO score) that will make the borrower eligible for a loan.

In example embodiments, the banking module 270 may not be able to determine a subset of lenders willing to approve the borrower's 230 requested loan. For example, the borrower 230 may have requested a loan amount or loan terms that no lender is willing to approve based on the borrower's 230 borrower information, the requested financing plan information, and/or the credit bureau information. In such instances, the banking module 270 may determine a subset of lenders who would approve an alternate loan (i.e., the banking module 270 may take a "second look"). In some embodiments, the CFS 250 could notify the borrower 230 that their request had been denied and ask if the borrower 230 would be interested in alternate loan options. If an application for credit is denied, the CFS 250 may generate an adverse action notice in compliance with legal requirements, according to some embodiments.

According to some embodiments, after determining a subset of lenders who are willing to approve the requested loan based on their bank credit policies, the banking module 270 may initiate a portfolio assignment process 425. In some embodiments, the banking module 270 may comprise a rules engine that incorporates bank funding commitments (i.e., the total amount of money a particular lender is committed to lending via the CFS 250), bank funding utilization (i.e., the total amount of the commitment that has been allocated), consumer credit risk profiles, whether the bank participates in a consumer's state, bank credit policies, and regulatory policies to properly assign a finance partner (i.e., bank or lender). Accordingly, in some embodiments, the portfolio assignment process 425 may involve determining the appropriate lender for a particular loan based on evaluating, for example, the lender's bank credit policies, bank funding utilization, consumer credit risk profiles, etc., that may influence which lender is most appropriate to assign a particular loan. In some embodiments, if two lenders are equally suited for assignment of a loan, the banking module 270 may determine which of the lenders is "next in line" to be assigned a loan, which may be based on the lender's utilization as well as other factors.

At 430, the banking module 270 may generate documents relating to the loan (i.e., electronic loan documents), which, as discussed, may include information such as the Truth in Lending Act disclosures (which may include, but are not limited to, the annual percentage rate, the amount financed, and the term of the installment loan), the loan agreement (which may include the name of the lender to which the loan was assigned at 425), the payment access device, and the lender's specific Gramm-Leach-Bliley privacy notice. At 435, the banking module 270 may transmit the electric loan documents to the merchant module 265 for presentation to the borrower 230. In some embodiments, the banking module 270 may transmit an email to borrower 230 that contains a link to a web portal where borrower 230 may access the electronic loan documents online. In some embodiments, the banking module may generate a physical copy of the electronic loan documents to mail directly to the borrower 230.

Figure 5:
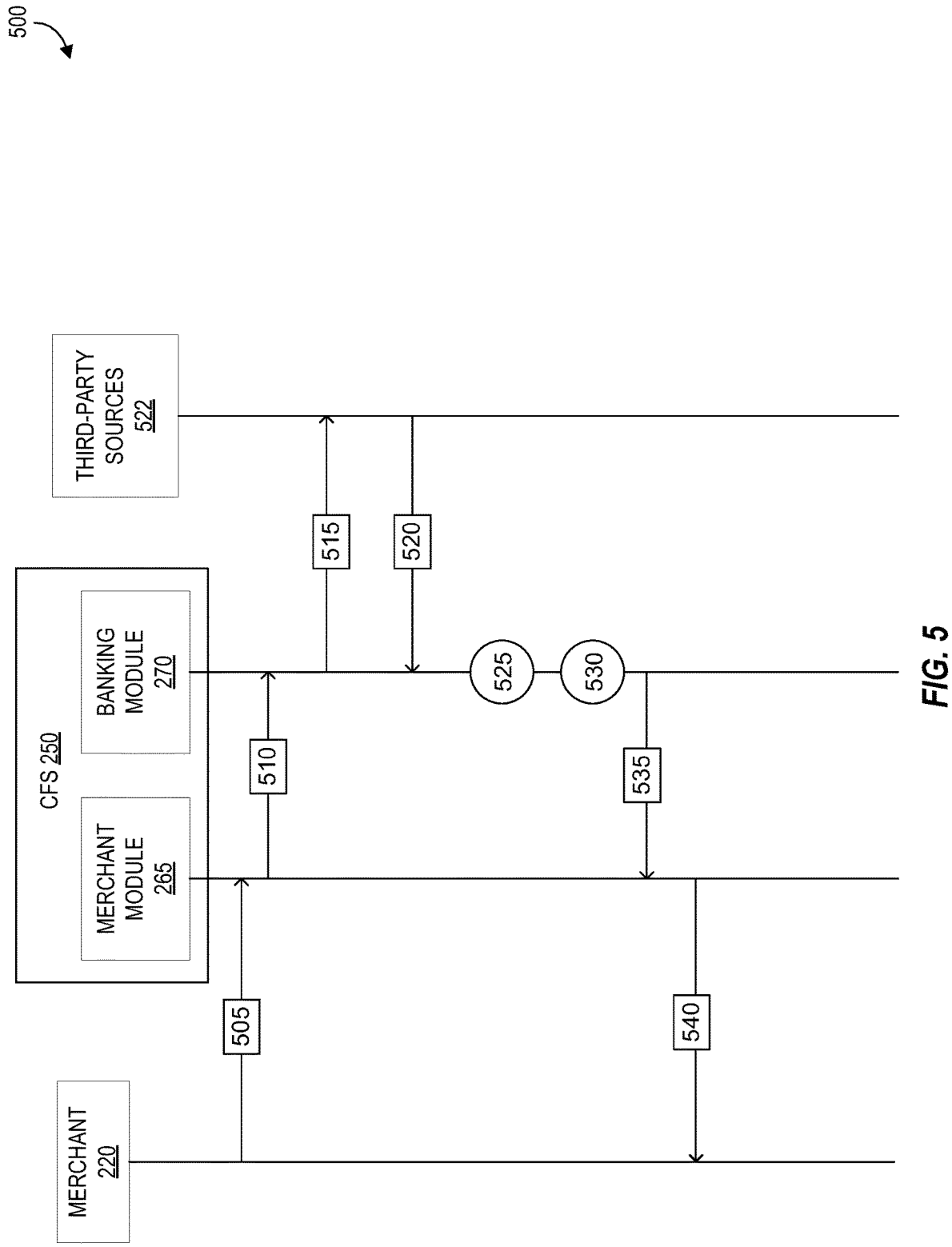
FIG. 5 is a sequence diagram illustrating an example merchant credentialing process 500, according to some embodiments.

In some embodiments, prior to a credit application process 300 or an underwriting process 400, a CFS 250 may initiate a merchant credentialing process 500, as shown in FIG. 5. As will be understood and appreciated, a merchant credentialing process 500 can occur prior to or independently of a credit application process 300 or an underwriting process 400. In some embodiments, a CFS 250 may utilize a merchant credentialing process 500 to evaluate the credit worthiness of a merchant 220 as well as to determine if a merchant 220 poses a fraud risk. As will be understood and appreciated, by performing a merchant credentialing process 500, a CFS 250 may be better able to protect the interests of potential borrowers 230. In particular, merchants deemed to have poor credentials based on a merchant credentialing process 500 may not have the opportunity to provide financing plans associated with a CFS 250. Alternatively, upon determining that a merchant 220 has superior credentials, a CFS 250 may designate to the merchant 220 desirable financing plans, which the merchant 220 may then offer to its customers.

For example, in some embodiments, a merchant 220 may be interested in providing financing plans to its customers or potential customers (i.e., potential borrowers 230). Accordingly, at 505, a merchant 220 may provide certain information (i.e., merchant information), which may include basic identifying information, to a CFS 250 such that the CFS 250 can initiate a merchant credentialing process 500. Additionally, a merchant 220 may provide information to the CFS 250 relating to a particular volume of loans that the merchant 220 is committed to offering to various potential customers (i.e., potential borrowers 230).

Upon receipt of the merchant information and the information relating to the volume of loans, at 510, a merchant module 265 may transmit the merchant information to a banking module 270, which may in turn transmit the merchant information to one or more third-party sources 522 to acquire additional information (i.e., merchant risk information) relating to the merchant's 220 credentials, at 515. For example, a third-party source 522 may provide business research and risk solution services relating to the merchant 220 (e.g., LexisNexis' or Dun & Bradstreet, Inc.). Additionally, a third-party source 522 may provide information to help evaluate whether a merchant 220 may present a fraud risk. For example, a third-party source may indicate whether a merchant 220 has filed for bankruptcy or has recently or repeatedly reincorporated.

In some embodiments, at 520, a banking module 270 may receive merchant risk information from one or more third-party sources 522. Accordingly, at 525, the CFS 250 may initiate a credential evaluation process to determine a merchant's 220 credentials. In some embodiments, in performing a credential evaluation process, a CFS 250 may factor merchant risk information relating to the merchant 220, which may include evaluating information harvested from various business reports (e.g., Dun & Bradstreet reports), personal credit reports, state licenses, and other information to help determine the potential risk associated with a merchant 220. In addition, in some embodiments, a credential evaluation process may evaluate the volume of loans to which the merchant 220 has committed to offering. In an example embodiment, a credential evaluation process may determine that a merchant 220 who commits to offering a large volume of loans and who has favorable merchant risk information has favorable credentials. Accordingly, at 530, the banking module 270 may perform a rate plan assignment process in which the banking module 270 assigns desirable rate plans to the merchant 220, which the merchant 220 is then authorized to make available to potential borrowers (e.g., borrower 230). As will be understood and appreciated, a merchant 220 having less-favorable credentials may be assigned less-desirable rate plans. Accordingly, at 535, the banking module may transmit the assigned rate plans to the merchant module 265, which may in turn transmit the rate plans to the merchant 220, at 540. As will be understood and appreciated, upon receiving the assigned rate plans, the merchant 220 may begin offering the one or more plans to potential borrower's 230.

Figure 6:
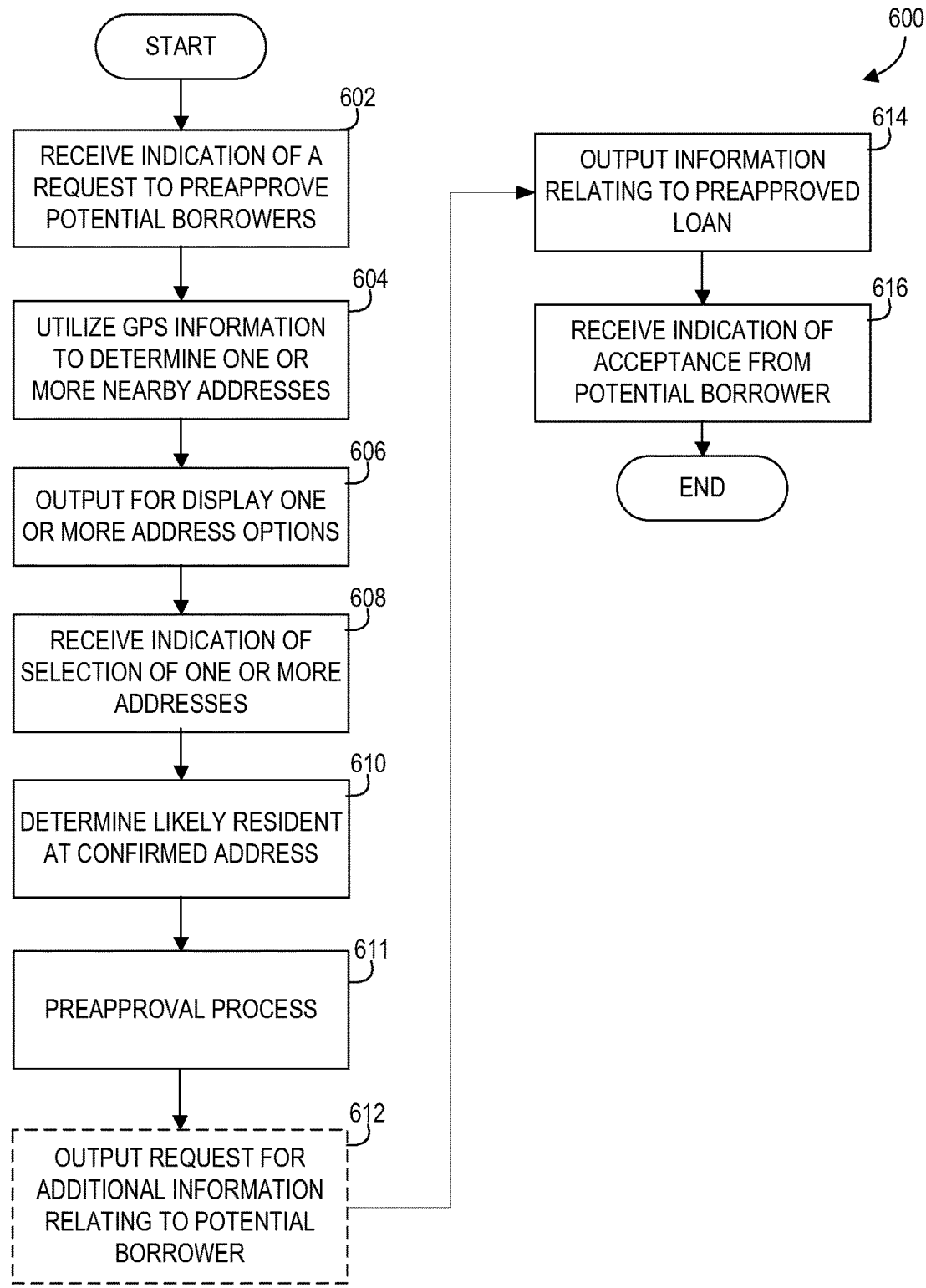
FIG. 6 is a flow chart illustrating an example preapproval process 600, according to some embodiments.

FIG. 6 is a flow chart illustrating an example preapproval process 600, according to some embodiments. In some embodiments, at 602, a merchant 220 may provide an input to a computing device (e.g., 240) indicating a desire to utilize an application for obtaining preapproval of one or more potential borrowers (e.g., 230) based on physical location (i.e., based on the physical location of the merchant 220 and/or the merchant's computing device 240). At 604, the computing device 240 may utilize GPS coordinates to determine one or more addresses near to the current location of the merchant 220 and the computing device 640, according to some embodiments. As will be appreciated, in this way, a merchant can use GPS coordinates to preapprove one or more potential borrowers in, for example, a particular neighborhood. Further, in some embodiments, the computing device 240 may provide the merchant 220 with the ability to enter a particular address by, for example, using a map application or a keyboard interface 101 or presence sensitive input interface 108 associated with the computing device 240.

In some embodiments, at 606, based at least in part on the GPS coordinates, the computing device 240 can present to the merchant 220 one or more addresses near to the current location of the merchant. Further, in some embodiments, at 608, the merchant 220 may provide an input to the computing device 240 indicating a selection of one or more addresses. At 610, the computing device 240 may determine the likely owner or resident at the confirmed address. For example, the computing device 240 may access one or more publicly available address databases via a network 205 (e.g., the internet).

After determining the likely resident at the confirmed address, at 610, the computing device 240 may initialize a preapproval process 611. In some embodiments, a preapproval process 611 may share many steps in common with an underwriting process 400, as discussed in relation to FIG.

4. Thus, for example, in some embodiments, after receiving information relating to the potential borrower to be preapproved (e.g., address information, first and last name, and various other borrower-related information determined at 610), a merchant module 265 may transmit the information to a banking module 270, and the banking module 270 may transmit the information relating to the potential borrower to a credit bureau 422 to request credit bureau information relating to the potential borrower. As will be understood, credit bureau information may include a credit score or information relating to the potential borrower's credit characteristics, including but not limited to, credit card accounts, other loans, or other financial information. As discussed above, in some embodiments, the banking module 270 may employ certain third-party software to assist with various processes of the banking module 270, which may include the acquisition of credit bureau information from a credit bureau. Subsequently, the banking module 270 may receive the credit bureau information relating to the potential borrower and determine one or more banking partners or lenders that may fund a loan for the potential borrower. For example, the banking module 270 may perform processes similar to those described in relation to FIG. 4 to determine a potential banking partner or lender.

In some embodiments, following the preapproval process 611, a merchant 220 can access the preapproval information using the computing device 240. For example, the merchant 220 may search for the potential borrower by name or address. Further, in some embodiments, the borrower 220 can access the information relating to the potential borrower hours or days after the preapproval process 611. In some embodiments, the information relating to the potential borrower may indicate that more information is necessary before a loan can be approved for that specific potential borrower (and will be clear that the potential borrower has not been declined). For example, the CFS 250 may require further information about the potential borrower before a loan can be approved for that potential borrower. Thus, for example, at 612, the computing device 240 may display a message asking that the potential borrower provide additional information such as date of birth and/or Social Security number, which can be sent to a CFS 250 for processing.

In some embodiments, at 614, the computing device 240 can output the information relating to a preapproved loan for display such that it can be reviewed by the merchant 220 and the potential borrower and such that the potential borrower can input an acceptance, at 616. As discussed, in some embodiments, acceptance by a borrower 230 may complete the loan application and trigger issuance of loan documents.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the sequence diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the sequence diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A non-transitory computer-readable storage medium storing instructions that, when executed by one or more processors, cause a computing device to perform operations to:

receive, at the computing device and from a merchant computing device and via a first network, merchant information associated with a merchant;

transmit, from the computing device and to a third-party entity and via a second network, the merchant information and a request for merchant risk information that is based at least in part on the merchant information;

receive, at the computing device and from the third-party entity and via a third network, (i) the merchant risk information comprising fraud risk information including information relating to a bankruptcy or a reincorporation associated with the merchant and (ii) a volume of loans to which the merchant has committed to offering, wherein the merchant risk information comprises business research and/or risk solution information relating to the merchant;

perform, by the computing device, a credential evaluation of the merchant based at least in part on an evaluation of the merchant risk information and at least in part on the volume of loans to which the merchant has committed to offering;

perform, by the computing device, a rate plan assignment by determining at least one assigned rate plan that the merchant is authorized to offer to a customer, the determining based at least in part on the credential evaluation of the merchant;

transmit, from the computing device and to the merchant computing device and via a fourth network, the at least one assigned rate plan that the merchant is authorized to offer to the customer for presentation at the merchant computing device, wherein the at least one assigned rate plan is operable for the customer to acquire goods or services offered by the merchant;

receive, over a fifth network, from a borrower computing device associated with a particular borrower or a second merchant computing device associated with the merchant, (i) borrower information relating to the particular borrower and (ii) the particular borrower's request of the at least one assigned rate plan, the particular borrower being (i) a customer of a merchant and (ii) at a location associated with the merchant; and transmit, over a sixth network, a credit offer for presentation to the particular borrower at the borrower computing device or the second merchant computing device, the credit offer including terms relating the at least one assigned rate plan, wherein each of the first, second, third, fourth, fifth, and sixth networks are an internet network.

2. The non-transitory computer-readable storage medium of claim 1, wherein receiving the volume of loans with the merchant risk information comprises:

receive, at the computing device and from the merchant computing device and via a seventh network, loan volume information associated with the merchant, the loan volume information indicating the volume of loans the merchant is committing to offer to potential borrowers.

3. The non-transitory computer-readable storage medium of claim 1, wherein the business research and/or risk solution information relating to the merchant comprises at least one of a business credit report, a personal credit report, and a licensure status.

4. The non-transitory computer-readable storage medium of claim 1, wherein the first, second, third, fourth, fifth, and sixth networks are the same network.

5. The non-transitory computer-readable storage medium of claim 1, wherein each of the first, second, third, fourth, fifth, and sixth networks are respectively one or more of a local area network, a wide area network, a cellular network, a radio frequency network, a short-range wireless network, a Wi-Fi enabled network, and a computer network of an interconnected computer network using the Internet protocol suite.

6. A method comprising:

receiving, at a computing device and from a merchant computing device and via a first network, merchant information associated with a merchant;

transmitting, from the computing device and to a third-party entity and via a second network, the merchant information and a request for merchant risk information that is based at least in part on the merchant information;

receiving, at the computing device and from the third-party entity and via a third network, the merchant risk information comprising fraud risk information including information relating to a bankruptcy or a reincorporation associated with the merchant;

performing, by the computing device, a credential evaluation of the merchant based at least in part on an evaluation of the merchant risk information;

performing, by the computing device, a rate plan assignment by determining an assigned rate plan corresponding to a favorability of the credential evaluation, the assigned rate plan indicating that the merchant is authorized to offer the assigned rate plan to customers, the determining based at least in part on the credential evaluation of the merchant;

transmitting, from the computing device and to the merchant computing device and via a fourth network, the assigned rate plan that the merchant is authorized to offer to the customer for presentation at the merchant computing device, wherein the assigned rate plan is operable for the customer to acquire goods or services offered by the merchant;

receiving, over a fifth network, from a borrower computing device associated with a particular borrower or a second merchant computing device associated with the merchant, (i) borrower information relating to the particular borrower and (ii) the particular borrower's request of the at least one assigned rate plan, the particular borrower being (i) a customer of a merchant and (ii) at a location associated with the merchant; and transmitting, over a sixth network, a credit offer for presentation to the particular borrower at the borrower computing device or the second merchant computing device, the credit offer including terms relating the at least one assigned rate plan, wherein each of the first, second, third, fourth, fifth, and sixth networks are an internet network.

7. The method of claim 6 further comprising:

receiving, at the computing device and from the merchant computing device and via a seventh network, loan volume information associated with the merchant, the loan volume information indicating a volume of loans the merchant is committing to offer to potential borrowers.

8. The method of claim 7, wherein the credential evaluation of the merchant is further based at least in part on an evaluation of the loan volume information.

9. The method of claim 6, wherein the merchant risk information comprises business research and/or risk solution information relating to the merchant.

10. The method of claim 9, wherein the business research and/or risk solution information relating to the merchant comprises at least one of a business credit report, a personal credit report, and a licensure status.

11. The method of claim 6, wherein the first, second, third, fourth, fifth, and sixth networks are different networks.

* * * * *